3,560,593
PRODUCTION OF BLOCK COPOLYMERS
Henry L. Hsieh, Bartlesville, Okla., assignor to Phillips Petroleum Company, a corporation of Delaware
No Drawing. Filed Jan. 2, 1968, Ser. No. 694,809
Int. Cl. C08f 15/04
U.S. Cl. 260—880   3 Claims

ABSTRACT OF THE DISCLOSURE

Rubbery block copolymers of conjugated dienes and monovinyl-substituted aromatic compounds are made in the presence of a cyclopentyllithium initiator by first charging one of the monomers and allowing it to polymerize to substantially complete conversion of monomer into polymer, adding a dissimilar monomer to the first formed reaction mixture and allowing it to polymerize to substantially complete conversion and finally adding the remaining monomer which is dissimilar to the second monomer. Block copolymers prepared by this method have high green tensile strength.

---

This invention relates to the preparation of block copolymers. In one aspect, it relates to a process for preparing block copolymers of conjugated dienes and monovinyl-substituted aromatic hydrocarbons. In another aspect, this invention relates to the preparation of block copolymers having a high green tensile strength.

It is known that various types of polymers can be prepared from different monomeric materials, the particular type formed being generally dependent upon the procedure followed in contacting the materials in the polymerization zone. For example, copolymers such as butadiene/styrene copolymer, can be prepared by the simultaneous reaction of the copolymerizable monomers. It is also possible to prepare polymers which are commonly known as graft copolymers by joining a co-monomer to an already formed polymer at various points along the polymer chain. Still other types of polymers can be obtained by following a procedure known as block polymerization. The polymers, usually referred to as block copolymers, are formed by polymerizing a monomer onto the end of a polymer, the monomer being introduced in such a manner that substantially all of the co-reacting molecules enter the polymer chain at the end of the growing polymer chain. The particular method used in preparing the polymers has a great influence on the properties of the product obtained.

Recently, rubbery polymers that can be employed without vulcanization have become increasingly important for certain applications such as shoe soles, swim fins, face masks, and the like. In view of the developing interests in the production of rubbery polymers that can be utilized without vulcanization, new methods for producing polymers having high green tensile strength values are being sought.

It is an object of this invention to provide a process for preparing rubbery block copolymers.

Another object of this invention is to provide a process for preparing rubbery block copolymers of conjugated dienes and monovinyl-substituted aromatic hydrocarbons.

Still another object of this invention is to provide a method for producing rubbery block copolymers of conjugated dienes and monovinyl aromatic hydrocarbons that have a high green tensile strength.

Broadly, my invention is the discovery that rubbery block copolymers of monovinyl-substituted aromatic compounds and conjugated dienes having high green tensile strength can be prepared by contacting the monomers with a cyclopentyllithium polymerization initiator.

In preparing the rubbery block copolymers of my invention, a monomeric material comprising at least one monovinyl-substituted aromatic compound or at least one monovinyl-substituted aromatic compound and at least one conjugated diene is contacted with a cyclopentyllithium initiator in a polymerization system. After substantially all of this first monomeric material has polymerized, a second monomeric material different from the first comprising at least one conjugated diene or at least one conjugated diene and at least one monovinyl-substituted aromatic compound is added to the polymerization reaction mixture which has not been treated to inactivate the initiator. After the second polymerizable monomeric material has polymerized to substantial completion, a third monomeric material different from the second comprising at least one monovinyl-substituted aromatic compound or at least one monovinyl-substituted aromatic compound and at least one conjugated diene is added to the polymerization reaction mixture, which has not been treated in any manner to inactivate the initiator, and allowed to polymerize. The resulting rubbery block copolymer has high green tensile strength.

The polymerizable monomers that can be utilized in the preparation of rubbery block copolymers in accordance with my invention are conjugated dienes containing from 4 to 12 carbon atoms per molecule. Preferably, these conjugated dienes will contain from 4 to 8 carbon atoms per molecule. Examples of suitable conjugated dienes are 1,3-butadiene, isoprene, piperylene, 2-methyl-1,3-pentadiene, 3,4-dimethyl-1,3-hexadiene, 4,5-diethyl-1,3-octadiene and the like.

The monovinyl-substituted aromatic compounds that can be used in the process of my invention contain from 8 to 20 carbon atoms per molecule. Examples of these compounds include styrene, 3-methylstyrene, 1-vinylnaphthalene, 2-vinylnaphthalene, and the like.

In order to form the rubbery block copolymers having high green tensile strength, it is necessary to utilize a cyclopentyllithium initiator having the following structure:

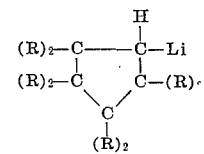

wherein each R group can be hydrogen or an alkyl group containing from 1 to 6 carbon atoms per group. It is preferred that no more than two of the R groups be alkyl groups. The most preferred initiator used in accordance with my invention is cyclopentyllithium wherein all of the R groups are hydrogen. Examples of suitable initiators are 2 - methylcyclopentyllithium, 3 - methylcyclopentyllithium, 2,3-dimethylcyclopentyllithium, 2,3,4-trimethylcyclopentyllithium, 3,3 - diethylcyclopentyllithium, 2,2 - dihexylcyclopentyllithium, 2,4-dimethylcyclopentyllithium, 2,3,4,5 - tetramethylcyclopentyllithium, 2-ethylcyclopentyllithium, 3 - isobutylcyclopentyllithium, 2,3-dipropylcyclopentyllithium, 3-hexylcyclopentyllithium, 2,3-dihexylcyclopentyllithium, and the like.

It is preferred that the polymerization reaction be carried out in the presence of an inert diluent, although in some instances it is not necessary to use a diluent. The preferred diluents are hydrocarbons which are liquid under polymerization conditions. The hydrocarbon diluents can be paraffins, cycloparaffins, and aromatics. The preferred hydrocarbon diluents include propane, isobutane, n-pentane, isooctane, n-dodecane, cyclopentane, cyclohexane, benzene, toluene, xylene, naphthalene, and the like.

The polymerization temperature is generally in the range of from about −20 to about 250° C. Preferably, the polymerization will be carried out in a range of from about 20 to 120° C. The polymerization process is generally carried out at a pressure sufficient to maintain at least a portion of the monomeric material in the liquid phase.

The amount of cyclopentyllithium initiator used is in the range of from about 0.1 to about 10 gram millimoles of initiator per 100 grams of monomers to be polymerized. Preferably, the initiator will be present in a range of from about 0.3 to about 5 gram millimoles per 100 grams of monomers to be polymerized.

The monomeric materials utilized to the block copolymer can be polymerized in varying proportions; however, to obtain rubbery block copolymers having high green tensile strength, the total amount of monovinyl-substituted aromatic compounds employed should be in the range of about 20 to 50 weight percent and the total amount of conjugated dienes should be in the range of about 50 to 80 weight percent, both based on the weight of the total monomers. Also, the amount of monovinyl-substituted aromatic compounds in each of the monomeric materials charged first and thirdly should be at least 10 weight percent based on the weight of the total monomers used to form the polymer and the amount of conjugated diene in each of these particular monomeric materials, when present, should be 35 or less parts by weight per 100 parts of monovinyl-substituted aromatic compound in each first and third charge.

The rubbery block copolymers of my invention are made by adding the first monomeric material to the polymerization system, allowing it to contact the cyclopentyllithium initiator and polymerize. After substantially all of the first monomeric material has polymerized, the second monomeric material is added to the polymerization reaction mixture, prior to any treatment which may inactivate the initiator, and is allowed to polymerize. Finally, the third monomeric material is added to the polymerization system, which has not been treated to inactivate the initiator, and is allowed to polymerize. It is important that the polymerization reaction mixture not be treated in any manner to inactivate the polymerization initiator during the polymerization process else the desired block copolymer will not be produced.

The resulting block copolymer, which has three distinct polymer blocks, can be represented by the structure A–B–A. Depending on the composition of the first and third monomeric materials used, A will be a homopolymer of a monovinyl-substituted aromatic compound, a copolymer of two or more monovinyl-substituted aromatic compounds, or a copolymer of one or more monovinyl-substituted aromatic compounds, and one or more conjugated dienes. The amount of monovinyl-substituted aromatic compound in each A block, which is resinous, is at least 10 weight percent based on the total weight of the polymer and the amount of conjugated diene in each A block, when present, is 35 or less parts by weight per 100 parts of the monovinyl-substituted aromatic compound present in each A block. Depending on the composition of the second monomeric material used, the B block, which is rubbery, will be a homopolymer of a conjugated diene, a copolymer of two or more conjugated dienes, or a copolymer of one or more conjugated dienes and one or more monovinyl-substituted aromatic compounds. The amount of monovinyl-substituted aromatic compound in the B block, when present, is 100 or less parts by weight per 100 parts of the conjugated diene in the B block. It has been found that the block copolymers made in accordance with this polymerization process, using the cyclopentyllithium type initiator, have unusually high green tensile strength. The green tensile strength of these copolymers is substantially higher than that made with other organolithium polymerization initiators.

In the preferred method of my invention, rubbery block copolymers made up of three distinct homopolymer blocks are made by charging a monovinyl-substituted aromatic compound as the initial monomer, and after the substantial polymerization of that monomer, a conjugated diene monomer is added, followed by the addition of a monovinyl-substituted aromatic compound, which can be the same or different from the first monomer, after substantial polymerization of the second monomer. The most preferred method for carrying out my invention is in the addition of the monovinyl-substituted aromatic compound initially, followed by the addition of the conjugated diene monomer in the second polymerization step, with more of the same monovinyl-substituted aromatic compound added during the final and third polymerization step.

Various materials are known to inactivate the initiator composition of this invention. These materials include water, mercaptans, oxygen, etc. It is therefore desirable that the monomers and diluents be freed of these materials prior to introducing them into the polymerization system. These materials should also be excluded from the polymerization system during the polymerization reaction.

After the completion of the polymerization reaction, the reaction mixture can be treated with any suitable treating agent to inactivate the initiators. Various materials such as water, alcohol, organic or inorganic acids, can be utilized for this initiator inactivation. In some instances, it may be desirable to add an antioxidant material to the polymer in the polymerization zone prior to its recovery therefrom.

After the initiator has been inactivated, the polymer can be recovered from the polymerization zone by any well known method such as by steam stripping, coagulation, or the like. In some instances, it may be desirable to inactivate the initiator and recover the polymer by coagulation in a single step such as by the addition of alcohol to the polymerization zone.

The rubbery block copolymers made this invention can be utilized in many applications in the rubber industry. The rubbery copolymers can be used as the base material for chewing gum, or in shoe soles, the production of rubber swim fins, rubber face masks, and the like and can be used to make blown sponge or foam articles. The rubbery copolymers of my invention can also be used in conventional rubber compounding recipes such as in the production of automobile tires, hoses, and the like. In such instances, the rubbery block copolymer will be compounded using conventional compounding techniques and compounding recipes that include pigments, reinforcing agents, plasticizers, extenders, vulcanizing agents, vulcanization accelerators, etc. In addition, these copolymers can be blended with other polymers to improve the processability and green strength thereof.

A more comprehensive understanding of my invention can be obtained by referring to the following illustrative examples which are not intended to be unduly limitive of the invention.

EXAMPLE I

Runs were made for the preparation of block copolymers from butadiene and styrene using incremental monomer addition. A portion of the styrene was polymerized first after which the butadiene was added and polymerized A second portion of styrene was then introduced and polymerized to yield a block copolymer containing a central polybutadiene block and terminal polystyrene blocks. Variable amounts of cyclopentyllithium, n-butyllithium, tert-butyllithium and phenyllithium were employed as initiators. The materials charged in each step and time and temperature employed were as follows:

First polymerization step:

Styrene, parts by weight—15
Cyclohexane, parts by weight—780
Initiator, mhm.—Variable
Temperature, ° F.—122
Time, hours—1.5

Second polymerization step:
1,3-butadiene, parts by weight—70
Temperature, ° F.—122
Time, hours—5

Final polymerization step:
Styrene, parts by weight—15
Temperature, ° F.—122
Time, hours—2

MHM.-gram millimoles per 100 grams of monomer.

Each polymerization was conducted in an atmosphere of nitrogen. In the first step, cyclohexane was charged to the reactor which was then purged with nitrogen, styrene was added, and then the organolithium initiator. Polymerization of the initially added styrene was essentially complete in 1.5 hours at which time the butadiene was added and allowed to polymerize for 5 hours. The second portion of styrene was then introduced and polymerized for 2 hours. At the conclusions of the final polymerization step, the reaction was shortstopped with a 10 weight percent solution of 2,2'-methylene-bis(4-methyl-6-tert-butylphenol) in equal parts by weight of isopropyl alcohol and toluene using an amount sufficient to provide about one part by weight of the antioxidant per 100 parts by weight of the block copolymer. The polymer was then coagulated by pouring the mixture into isopropyl alcohol after which it was separated and dried. Results of the several runs were as follows:

| Run No. | Initiator Type | Mhm. | Inherent viscosity [a] | Green tensile, p.s.i. [b] |
|---|---|---|---|---|
| 1 | Cyclopentyllithium | 1.2 | 1.49 | 3,570 |
| 2 | do | 1.4 | 0.98 | 4,170 |
| 3 | do | 1.8 | 0.90 | 980 |
| 4 | n-Butyllithium | 1.2 | 1.28 | 1,060 |
| 5 | do | 1.4 | 1.11 | 1,520 |
| 6 | do | 1.8 | 0.87 | 245 |
| 7 | tert-Butyllithium | 1.2 | 1.07 | 1,080 |
| 8 | do | 1.4 | 0.94 | 350 |
| 9 | Phenyllithium | 1.2 | 2.92 | 500 |
| 10 | do | 1.4 | 2.21 | 590 |

[a] Determined according to the procedure of U.S. 3,278,508, column 20—Notes a and b.
[b] Determined according to ASTM D-412-62T on raw (uncured) polymers.

These data show that the block copolymers prepared in the presence of cyclopentyllithium had a significantly higher green tensile strength than those prepared in the presence of n-butyllithium, tert-butyllithium, and phenyllithium.

I claim:
1. A method for forming a rubbery block copolymer which comprises:
   (a) initially contacting a first monomeric material comprising styrene with an initiator comprising cyclopentyllithium and allowing substantially all of said styrene to polymerize to form a first reaction mixture;
   (b) thereafter adding to said first reaction mixture, prior to further treatment, a second monomeric material comprising 1,3-butadiene and allowing substantially all of said 1,3-butadiene to polymerize to form a second reaction mixture;
   (c) thereafter adding to said second reaction mixture, prior to further treatment, additional styrene and allowing at least a portion of said additional styrene to polymerize; and
   (d) recovering a block copolymer having the structure A–B–A.
2. The method according to claim 1 wherein said contacting is in the presence of an inert diluent.
3. The method according to claim 2 wherein said contacting is carried out at a temperature in the range of —20 to 250° C.

References Cited

UNITED STATES PATENTS 3,149,182   9/1964   Porter _____ 260—880B
3,265,765   8/1966   Holden et al. _____ 260—880B

FOREIGN PATENTS 746,555   11/1966   Canada _____ 260—880

JAMES A. SEIDLECK, Primary Examiner

U.S. Cl. X.R.

260—93.5, 665, 879